US006446029B1

United States Patent
Davidson et al.

(10) Patent No.: US 6,446,029 B1
(45) Date of Patent: Sep. 3, 2002

(54) METHOD AND SYSTEM FOR PROVIDING TEMPORAL THRESHOLD SUPPORT DURING PERFORMANCE MONITORING OF A PIPELINED PROCESSOR

(75) Inventors: Joel Roger Davidson, Austin; Judith K. Laurens, Elgin; Alexander Erik Mericas; Kevin F. Reick, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,449

(22) Filed: Jun. 30, 1999

(51) Int. Cl.[7] ................................................ G06F 15/00
(52) U.S. Cl. ........................ 702/186; 702/182; 712/227; 712/209
(58) Field of Search ................................. 702/186, 176, 702/177, 178, 182, 193; 712/227, 1, 16, 209, 247, 29; 714/37, 38, 1, 35, 39, 47, 51; 717/4

(56) References Cited

U.S. PATENT DOCUMENTS

| | | | | |
|---|---|---|---|---|
| 4,879,646 A | * | 11/1989 | Iwasaki et al. | 712/227 |
| 5,579,527 A | * | 11/1996 | Chen et al. | 712/16 |
| 5,581,778 A | * | 12/1996 | Chen et al. | 712/16 |
| 5,727,167 A | | 3/1998 | Dwyer, III et al. | 395/280 |
| 5,751,987 A | * | 5/1998 | Mahant-Shetti et al. | 711/5 |
| 5,809,450 A | | 9/1998 | Chrysos et al. | 702/186 |
| 6,249,906 B1 | * | 6/2001 | Levine et al. | 717/1 |

* cited by examiner

*Primary Examiner*—Marc S. Hoff
*Assistant Examiner*—Mohamed Charioui
(74) *Attorney, Agent, or Firm*—Duke W. Yee; Volel Emile; Stephen J. Walder, Jr.

(57) ABSTRACT

A method and system for monitoring the performance of a instruction pipeline is provided. The processor may contain a performance monitor for monitoring for the occurrence of an event within a data processing system. An event to be monitored may be specified through software control, and the occurrence of the specified event is monitored during the execution of an instruction in the execution pipeline of the processor. A particular instruction may be specified to execute within a threshold time for each stage of the instruction pipeline. The specified event may be the completion of a single tagged instruction beyond the specified threshold interval for a stage of the instruction pipeline. The performance monitor may contain a number of counters for counting multiple occurrences of specified events during the execution of multiple instructions, in which case the specified events may be the completion of tagged instructions beyond a threshold interval for any stage of the multiple stages of the execution pipeline. As the instruction moves through the processor, the performance monitor collects the events and provides the events for optimization analysis.

29 Claims, 6 Drawing Sheets

| TABLE ENTRY | INSTRUCTION TYPE | SOURCE | DESTINATION | PIPELINE STAGE THRESHOLD VALUES |
|---|---|---|---|---|
| 0 | | | | |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| ⋮ | | | | |
| N | | | | |

COMPLETION TABLE

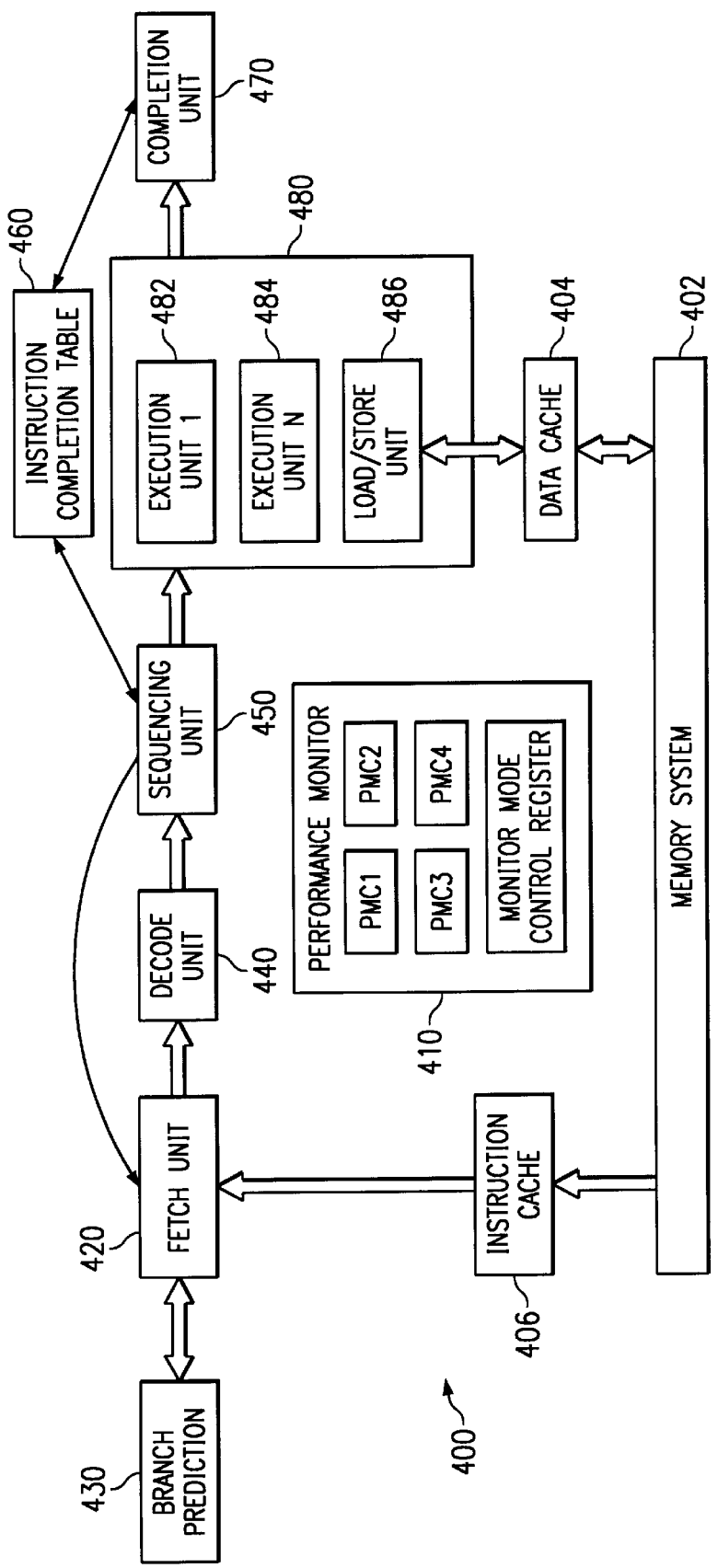

METHOD AND SYSTEM FOR PROVIDING TEMPORAL THRESHOLD SUPPORT DURING PERFORMANCE MONITORING OF A PIPELINED PROCESSOR

BACKGROUND OF THE INVENTION

1. Technical Field

The present invention relates generally to an improved data processing system and, in particular, to a method and system for monitoring performance within a data processing system.

2. Description of Related Art

In typical computer systems, system developers desire optimization of software execution for more effective system design. Usually, studies are performed to determine system efficiency in a program's access patterns to memory and interaction with a system's memory hierarchy. Understanding the memory hierarchy behavior helps optimize the system through the development of algorithms that schedule and/or partition tasks as well as distribute and structure data. In addition, utilization of a processor can be studied to understand the manner in which the execution of a program invokes various functions within the processor.

Within state-of-the-art processors, facilities are often provided which enable the processor to count occurrences of software-selectable events and to time the execution of processes within an associated data processing system. These facilities are known as the performance monitor of the processor. Performance monitoring is often used to optimize the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

To evaluate the efficiency of a processor, it is necessary to determine how much work is performed and how many resources are consumed on behalf of executing instructions. Many modern processors have the ability to execute instructions in an execution pipeline consisting of multiple stages. An instruction is fetched into a first stage and progresses from one stage to the next stage. Each unit along the pipeline operates on a different instruction by performing a single task for a particular stage of execution of the particular instruction. In addition, many modern processors execute instructions out-of-order with respect to the sequence in which the programmer coded the instructions or in which the compiler generated the instructions. As a result, instructions are completed, or retired, in order but execute as their data dependencies allow.

The optimization of software for a particular processor and the optimization of hardware for a particular software workload requires knowledge about the use of processor resources. Most modern processors implement performance monitor counters that count the occurrence of predefined events associated with the use of resources. However, in a processor with out-of-order execution of instructions, the out-of-order characteristic increases the difficulty of debugging the execution of a set of instructions. This may be especially difficult when one attempts to debug the execution of a set of instructions by interpreting an aggregation of events in a performance monitor counter that includes the execution of some instructions out-of-order. The ability to process instructions out-of-order may be disabled, but this attempt to debug an instruction may mask or avoid the very problem being debugged.

Therefore, it would be advantageous to have a method and system for accurately monitoring the use of resources within a processor that performs out-of-order execution of instructions. It would be further advantageous to have a method and system for providing knowledge of when the stages of a pipeline execute and how much time is spent in the various stages of the pipeline in a manner that distinguishes such execution at the level of a single instruction.

SUMMARY OF THE INVENTION

The present invention provides a method and system for monitoring the performance of an instruction pipeline. The processor may contain a performance monitor for monitoring for the occurrence of an event within a data processing system. An event to be monitored may be specified through software control, and the occurrence of the specified event is monitored during the execution of an instruction in the execution pipeline of the processor. A particular instruction may be specified to execute within a threshold time for each stage of the instruction pipeline. The specified event may be the completion of a single tagged instruction beyond the specified threshold interval for a stage of the instruction pipeline. The performance monitor may contain a number of counters for counting multiple occurrences of specified events during the execution of multiple instructions, in which case the specified events may be the completion of tagged instructions beyond a threshold interval for any stage of the multiple stages of the execution pipeline. As the instruction moves through the processor, the performance monitor collects the events and provides the events for optimization analysis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an illustration depicting an example representation of one configuration of an MMCR suitable for controlling the operation of two PMCs;

FIG. 4 is a block diagram depicting further details of the stages of an instruction pipeline within an out-of-order execution processor;

DETAILED DESCRIPTION OF THE PREFERRED EMBODIMENT

Figures 1, 6A:
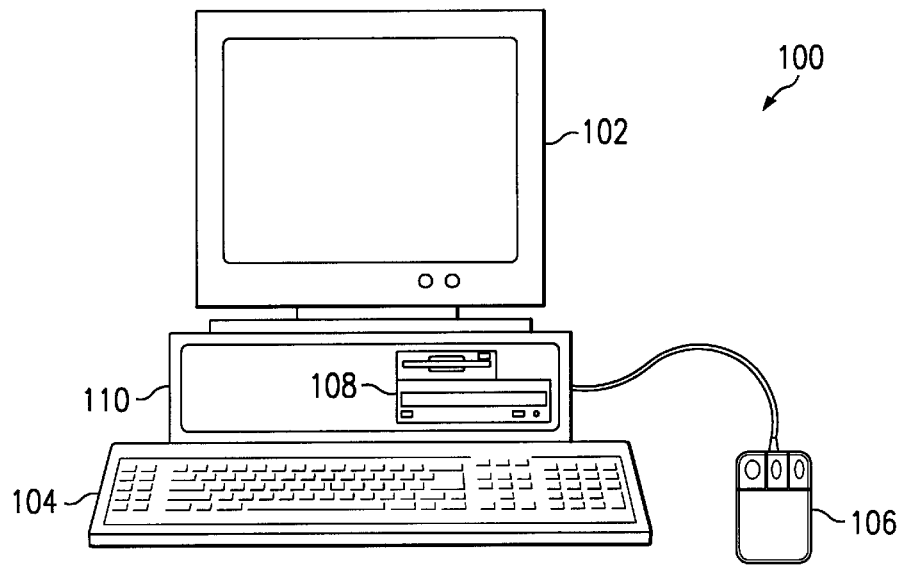
FIG. 1 depicts a data processing system in which the present invention may be implemented.
FIG. 6A is a diagram illustrating an instruction completion table that may be used in an out-of-order processor.

With reference now to FIG. 1, a pictorial representation depicts a data processing system in which the present invention may be implemented. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, servers, workstations, network computers, Internet appliances, palm computers, etc. System unit 110 comprises memory, a central processing unit, I/O unit, etc. However, in the present invention, system unit 110 contains a speculative processor, either as the central processing unit or as one of multiple CPUs present in the system unit.

Figure 2A:
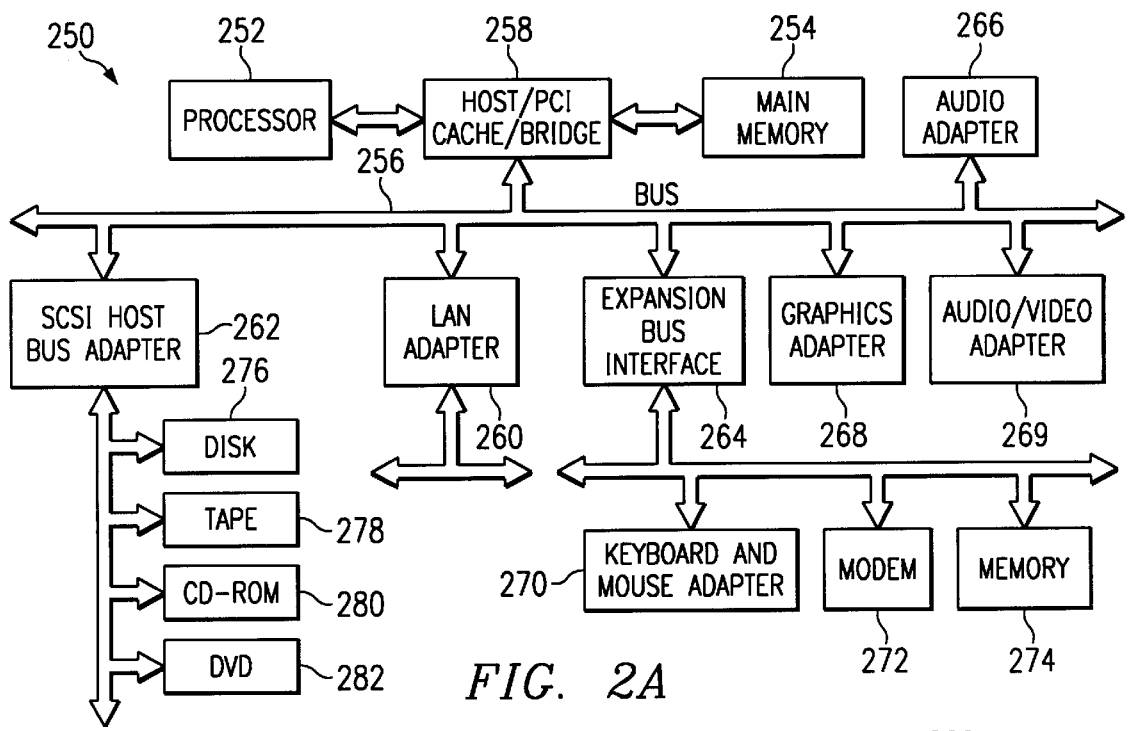
FIG. 2A is a block diagram depicting a data processing system in which the present invention may be implemented.

With reference now to FIG. 2A, a block diagram of a data processing system in which the present invention may be implemented is illustrated. Data processing system 250 is an example of a computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD 282 in the depicted example. Typical PCI local bus implementations will support three or four PCI expansion slots or add-in connectors.

An operating system runs on processor 252 and is used to coordinate and provide control of various components within data processing system 250 in FIG. 2A. The operating system may be a commercially available operating system such as Java OS or OS/2, which are available from International Business Machines Corporation. An object oriented programming system such as Java may run in conjunction with the operating system and provides calls to the operating system from Java programs or applications executing on data processing system 250. Instructions for the operating system, the object-oriented operating system, and applications or programs are located on storage-devices, such as hard disk drive 276 and may be loaded into main memory 254 for execution by processor 252. Often times, hard disk drives are absent and memory is constrained when data processing system 250 is used as a network client.

Those of ordinary skill in the art will appreciate that the hardware in FIG. 2A may vary depending on the implementation. For example, other peripheral devices, such as optical disk drives and the like may be used in addition to or in place of the hardware depicted in FIG. 2A. The depicted example is not meant to imply architectural limitations with respect to the present invention. For example, the processes of the present invention may be applied to a multiprocessor data processing system.

Figure 2B:
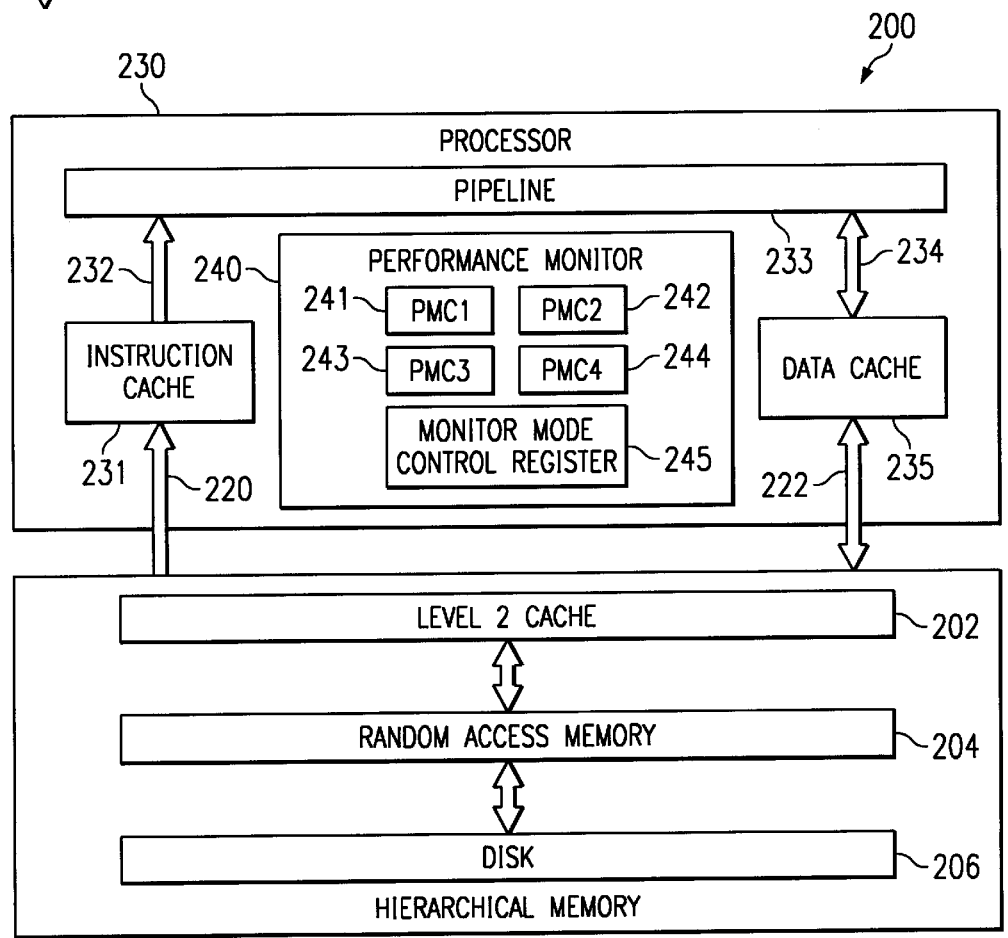
FIG. 2B is a block diagram depicting selected internal functional units of a data processing system that may include the present invention.

With reference now to FIG. 2B, a block diagram depicts selected internal functional units of a data processing system that may include the present invention. System 200 comprises hierarchical memory 210 and processor 230. Hierarchical memory 210 comprises Level 2 cache 202, random access memory (RAM) 204, and disk 206. Level 2 cache 202 provides a fast access cache to data and instructions that may be stored in RAM 204 in a manner which is well-known in the art. RAM 204 provides main memory storage for data and instructions that may also provide a cache for data and instructions stored on non-volatile disk 206.

Data and instructions may be transferred to processor 230 from hierarchical memory 210 on instruction transfer path 220 and data transfer path 222. Instruction transfer path 220 and data transfer path 222 may be implemented as a single bus or as separate buses between processor 230 and hierarchical memory 210. Alternatively, a single bus may transfer data and instructions between processor 230 and hierarchical memory 210 while processor 230 provides separate instruction and data transfer paths within processor 230, such as instruction bus 232 and data bus 234.

Processor 230 also comprises instruction cache 231, data cache 235, performance monitor 240, and instruction pipeline 233. Performance monitor 240 comprises performance monitor counter (PMC1) 241, performance monitor counter (PMC2) 242, performance monitor counter (PMC3) 243, performance monitor counter (PMC4) 244, and monitor mode control register (MMCR) 245. Alternatively, processor 230 may have other counters and control registers not shown.

Processor 230 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 233 via instruction cache 231. Instruction cache 231 contains instructions that have been cached for execution within pipeline 233. Some instructions transfer data to or from hierarchical memory 210 via data cache 235. Other instructions may operate on data loaded from memory or may control the flow of instructions.

Performance monitor 240 comprises event detection and control logic, including PMC1–PCM4 241–244 and MMCR 245. Performance monitor 240 is a software-accessible mechanism intended to provide detailed information with significant granularity concerning the utilization of processor instruction execution and storage control. The performance monitor may include an implementation-dependent, number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 230, and the chip area available within processor 230.

Performance monitor 240 monitors the entire system and accumulates counts of events that occur as the result of processing instructions. In the present invention, processor 230 allows instructions to execute out-of-order with respect to the order in which the instructions were coded by a programmer or were ordered during program compilation by a compiler. Processor 230 may also employ speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently. When the performance monitor is used in conjunction with instructions executed out-of-order in the manner provided by the present invention, the performance monitor may be used as a mechanism to monitor the performance of the stages of the instruction pipeline.

With reference now to FIG. 3, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled. Alternatively, an MMCR may set an initialization value, such as a temporal threshold value for a time interval in which a stage of the instruction pipeline is expected to execute for a given instruction, which is not shown in FIG. 3.

The initialization value is both variable and software selectable. The initialization value may be loaded into a table or register when an instruction is first scheduled for execution. For example, given that an event under study is "register accesses", if the initialization value denotes a number of register accesses for an associated instruction, then completion of the instruction allows the number of register accesses for the particular instruction to be added to the total event count in a PMC that counts all register accesses by all instructions. Of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily configured for use in identifying a variety of system performance characteristics.

Bits 0–4 and 18 of the MMCR in FIG. 3 determine the scenarios under which counting is enabled. By way of example, bit 0 may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCs. Bits 6–15 may be utilized to control time or event-based transitions. Bits 19–25 may be used for event selection for PMC1, i.e. selection of signals to be counted for PMC1. Bits 26–31 may be used for event selection for PMC2, i.e. selection of signals to be counted for PMC2. The function and number of bits may be chosen as necessary for selection of events as needed within a particular implementation.

At least one counter may be required to capture data for some type of performance analysis. More counters provide for faster or more accurate analysis. If the monitored scenario is strictly repeatable, the same scenario may be executed-with different items being selected. If the scenario is not strictly repeatable, then the same scenario may be executed with the same item selected multiple times to collect statistical data. The time from the start of the scenario is assumed to be available via system time services so that intervals of time may be used to correlate the different samples and different events.

With reference now to FIG. 4, a block diagram depicts further details of the stages of an instruction pipeline within an out-of-order execution processor. System 400 shows memory system 402, data cache 404, instruction cache 406, and performance monitor 410, which may be similar to the hierarchical memory, data cache, instruction cache, and performance monitor shown in FIG. 3. As instructions are executed, they cause events within the processor, such as cache accesses. Performance monitor 410 contains a plurality of PMCs that count events under the control of one or more MMCRs. The counters and the MMCRs are internal processor registers and can be read or written under software control.

Fetch unit 420 retrieves instructions from instruction cache 406, which in turn retrieves instructions from memory 402. Decode unit 440 decodes instructions to determine basic information about the instruction, such as instruction type, source registers, and destination registers. Sequencing unit 450 uses the decoded information to schedule instructions for execution. In order to track instructions, completion table 460 is used for storing and retrieving information about scheduled instructions. As sequencing unit 450 assigns the dispatched instruction to an associated entry in completion table 460, sequencing unit 450 assigns or associates entries to executing instructions on a first-in, first-out basis or rotating manner. As the instructions are executed, information concerning the executing instructions is stored into various fields and subfields of the associated entry of completion table 460 for the particular instruction.

Instructions executed by execution control unit 480 using one of the execution units 1–N, such as execution unit #1 482 or execution unit #N 484, may use load/store unit 486 to cause data to be read from or written to memory 402 via data cache 404. As instructions complete, completion unit 470 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new data location from which to begin fetching instructions. When fetch unit 420 receives a conditional branch operation and the data upon which. the condition is based is not yet available (e.g., the instruction that will produce the necessary data has not been executed), fetch unit 420 may use one or more branch prediction mechanisms in branch prediction control unit 430 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 5A:
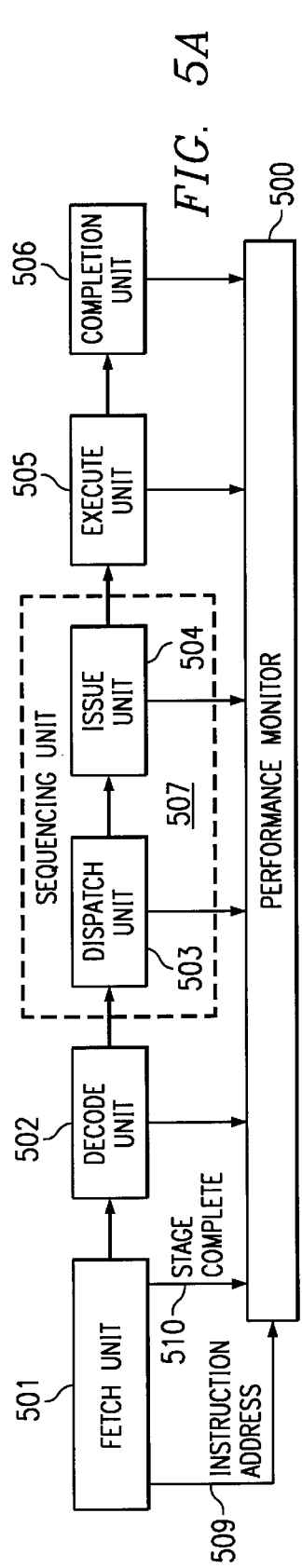
FIG. 5A is a block diagram depicting a simplified view of a pipelined processor that is capable of monitoring the execution of individual stages of an instruction pipeline.

With reference now to FIG. 5A, a block diagram depicts a simplified view of a pipelined processor that is capable of monitoring the execution of individual stages of an instruction pipeline. Units 501–506 depict individual stages of an instruction pipeline. Fetch unit 501 fetches instructions from memory, and decode unit 502 decodes the instructions to determine the type of instruction, its operands, and the destination of its result. Dispatch unit 503 requests operands for an instruction, and issue unit 504 determines that an instruction may proceed with execution. Execute unit 505 performs the operation on the operands as indicated by the type of instruction. Completion unit 506 deallocates any internal processor resources, such as the commitment of registers, that were required by the instruction. An instruction pipeline may have more or less stages. For example, the functions of dispatch unit 503 and issue unit 504 may be performed by a single unit, such as sequencing unit 507.

As an instruction is fetched, a single instruction may be selected and marked (or tagged). As the marked instruction flows through each pipeline unit representing a stage of the instruction pipeline, each pipeline unit signals its completion of the processing for the marked instruction by asserting a stage complete signal, such as signal 510. Performance monitor 500 collects the signals and makes the signals available to logic analysis software or performance analysis software.

Alternatively, each pipeline unit may signal its completion of any instruction without the requirement that the instruction has been previously tagged.

If only a single marked instruction may proceed through the instruction pipeline at any given time, then the instruction may be simply marked with a single bit. If multiple instructions may be marked, then a tag consisting of multiple bits may identify marked instructions.

Instructions may be marked based on a variety of selection mechanisms, each of which may be under the control of the performance monitor. An instruction may be selected at random, in which case the performance monitor may capture the instruction address after the instruction has been randomly selected, e.g., by receiving instruction address 509 from fetch unit 501. An instruction may be selected based on a general category of its instruction type, such as any store instruction. A specific type of instruction may be selected, such as a load instruction that uses particular registers. As another alternative, an instruction may be selected based on its instruction address, which provides functionality for a debugging program to store specific instructions at specific addresses and then to allow the processor to execute the instructions without setting interrupts or traps. The above list merely provides some examples and should not be considered an exhaustive list of potential instruction selection mechanisms.

Figure 5B:
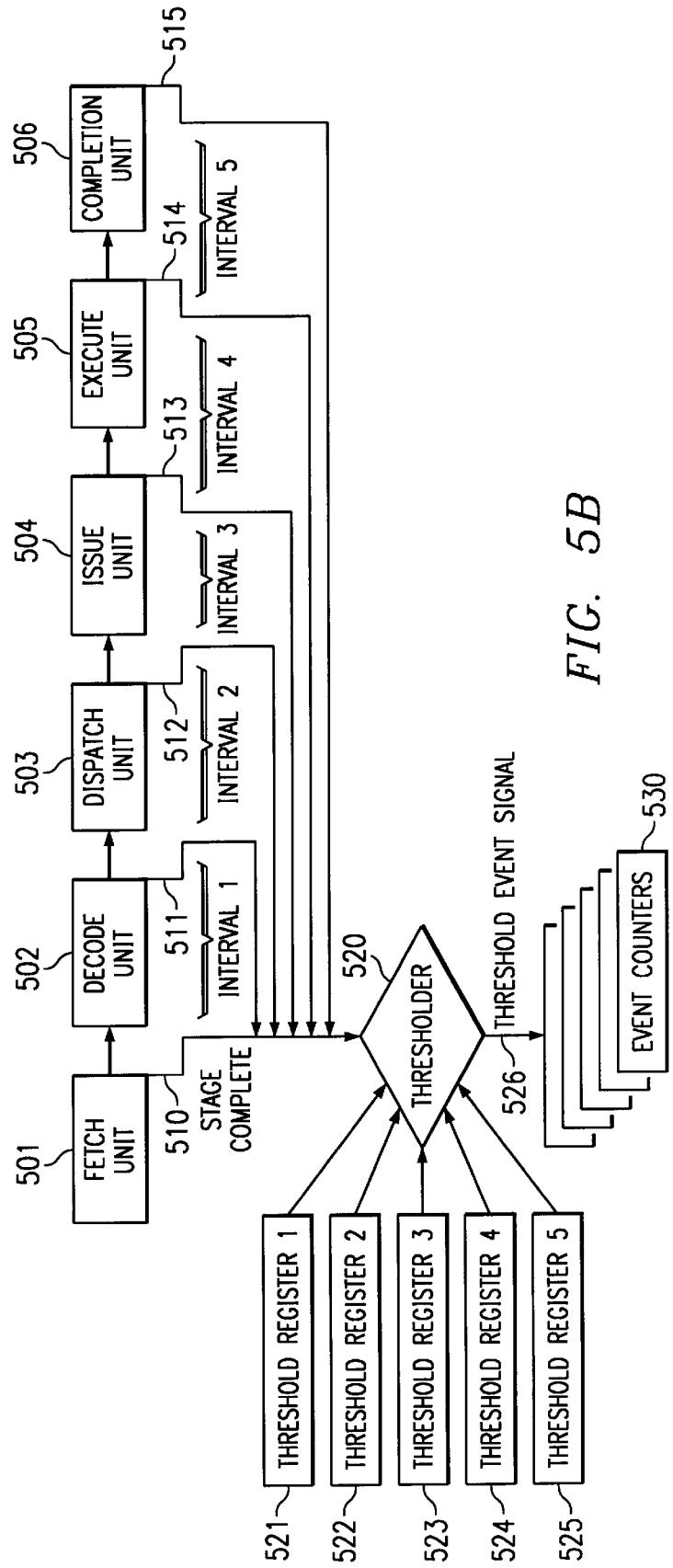
FIG. 5B is a block diagram depicting a simplified view of a pipelined processor that is capable of monitoring the execution intervals of individual stages of an instruction pipeline.

With reference now to FIG. 5B, a block diagram depicts a simplified view of a pipelined processor that is capable of monitoring the execution intervals of individual stages of an instruction pipeline. Units 501–506 depict individual stages of an instruction pipeline with stage complete signals 510–515, similar to the units and signals shown in FIG. 5A. The completion of a stage of the instruction pipeline may be monitored for a single marked instruction or for a set of tagged instructions.

An instruction is described as "flowing" through an instruction pipeline, although the execution proceeds unit-by-unit. An instruction commences a process of execution by being fetched from storage and inserted into the instruction pipeline. When an instruction completes its execution within an instruction pipeline stage, it may be described as entering the next stage in the instruction pipeline. The time period required for a particular stage of the instruction pipeline to complete its portion of the instruction execution is represented by the time intervals between its assertion of a completion signal and the assertion of a completion signal by the previous pipeline unit.

Alternatively, a completion signal may be generated by each pipeline unit at a particular point in time that may depend on other architectural details of the processor. For example, the completion signal may be asserted in response to other signals within the processor.

Thresholder 520 monitors the stage completion signals and compares the time intervals of each pipeline instruction stage with threshold values stored in threshold registers 521–525. If an instruction pipeline stage requires more time to complete than indicated by its corresponding threshold value, then thresholder 520 asserts a threshold event signal 526 that is collected by an event counter or multiple event counters 530 in the performance monitor. The performance monitor may merely count such events for presentation to performance monitoring software, or it may perform some other type of action, such as generating an interrupt.

With reference now to FIG. 6A, a diagram illustrates an instruction completion table that may be used in an out-of-order processor. Completion table 600 is organized as a circular list with each entry in completion table 600 tracking a single instruction. An instruction is said to have a "tag value" equal to its index value into completion table 600. The tag value associated with an instruction may be used to identify events caused by the execution of the instruction. Allocation tag 607 holds the index of the next available entry. Completion tag 606 holds the index of a completing instruction. If no completion table entries 601 are available, the sequencing unit of the processor stalls until an entry is available.

Completion table 600 contains instruction types 602, source 603, destination 604, and pipeline stage threshold values 605. Instruction type 602 may hold the minimum amount of information necessary to identify the particular type of instruction in a particular table entry, e.g., a number of bits that encode the instruction as a "load" instruction. Source 603 may be a source register or an effective source address for an operand or operands for the instruction, and destination 604 may be a destination register or an effective destination address for a result of the instruction. Pipeline stage threshold values 605 may be temporal interval values with one value for each stage of the instruction pipeline. If specified, the instruction in the table entry is expected to execute within the specified temporal interval for each stage of the instruction pipeline. If the pipeline stage requires a greater amount of time to execute than the specified amount of time, an event may be triggered and collected by the performance monitor.

FIG. 6A shows exemplary data within completion table 600 in which the completion tag points to entry 3 and the allocation tag points to entry 6. The instruction in entry 3 is next to complete. Instructions in entries 4–5 can be waiting to execute, currently executing, or waiting to complete. The next instruction that is decoded will be placed into entry 6 and the allocation pointer will increment to point to entry 7. If the allocation pointer points to entry N, then it will wrap to zero instead of incrementing to non-existent entry (N+1), i.e. the pointers wrap in a circular fashion. In this example, if the allocation pointer pointed to entry 2, no more entries would be available.

Alternatively, a single completion table entry may be allocated for a group of instructions. All of the instructions within the group would then be tracked with a single tag value.

Figure 6B:
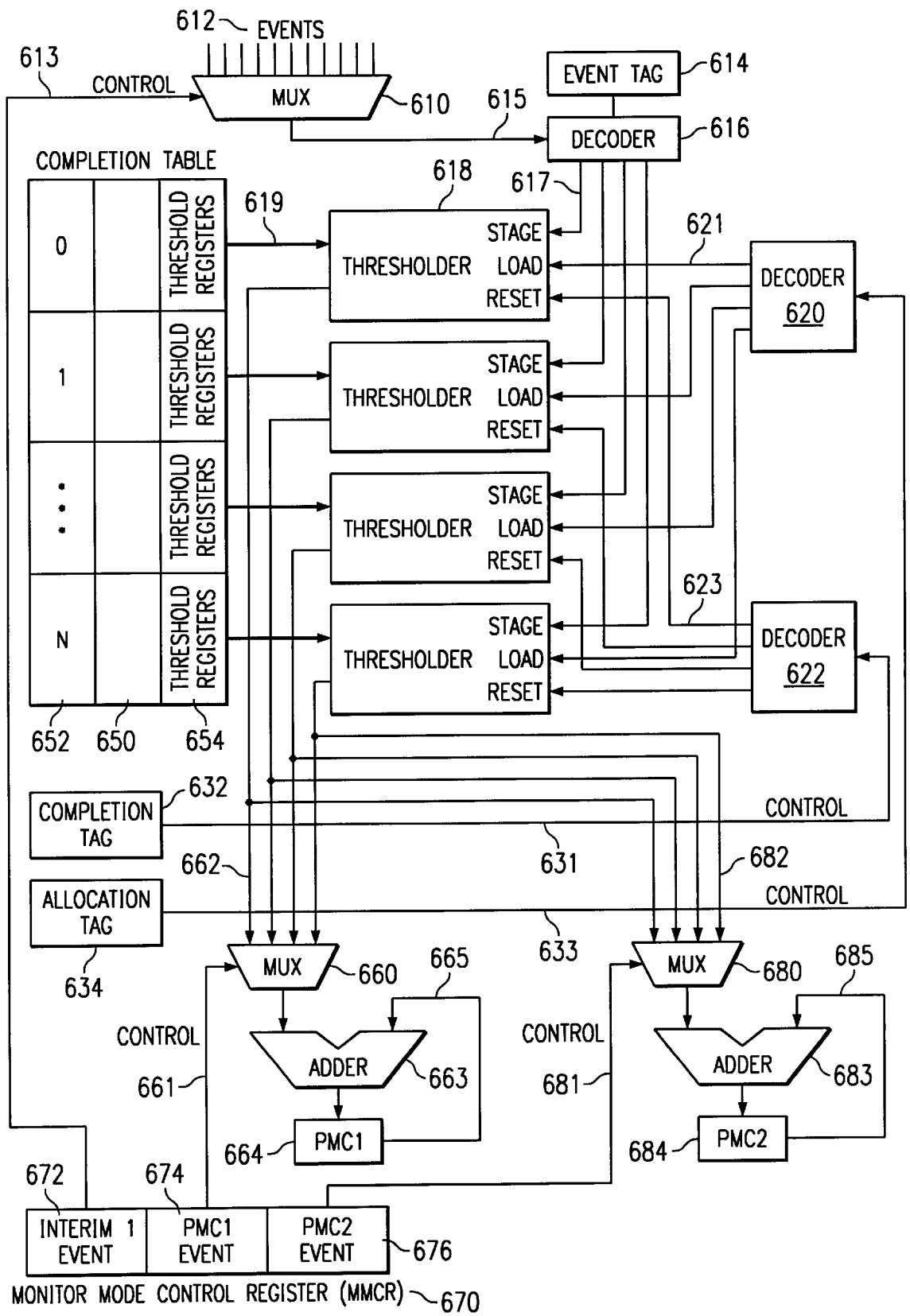
FIG. 6B is a diagram depicting a processor for counting events related to the execution of instructions within multiple stages of a instruction pipeline.

With reference now to FIG. 6B, a diagram depicts a processor for counting events related to the execution of instructions within multiple stages of an instruction pipeline. The completion of instructions are tracked through completion table 650. Each table entry has an associated tag value 652. An instruction's tag value is the entry's position in the table for the instruction, which allows the processor to identify the instruction which caused an event or events within the processor. As instructions "move through the system" (or execute), they generate events 612, which are signals that a particular event or condition has occurred. Along with the event signal, event tag 614 is used to identify which instruction has caused the event associated with the event signal.

Completion table 650 includes one or more threshold registers 654 per entry. The threshold registers hold Docket the temporal intervals within which the instruction is expected to execute for a particular stage of the instruction pipeline. The monitored event for an interim counter is controlled by field 672 in MMCR 670. The contents of field 672 are used to generate signal 613 to control multiplexor 610 Which filters event signals 612.

Event tag 614 is used to route selected event signal 615 through decoder 616 to the appropriate instruction's thresholder. Thresholder 618 receives signal 617 as an indication that a particular stage of the instruction pipeline has been completed.

If an instruction is canceled, its entry in completion table 650 will be re-allocated, and threshold events will no longer need to be monitored for the canceled instruction. Completion tag 632 contains the index into completion table 650 that indicates the instruction that is completing. Completion tag 632 is used as control signal 631 to control decoder 622 to send a reset signal, such as reset signal 623, to the appropriate thresholder, such as thresholder 618.

Allocation tag 634 contains the index into completion table 650 that indicates the next instruction that has been scheduled for the instruction pipeline.

Allocation tag 634 is used as control signal 633 to control decoder 620 to send a load signal, such as load signal 621, to the appropriate thresholder causing the appropriate threshold registers, such as threshold registers 654, to be loaded as input 619 into the appropriate thresholder, such as thresholder 618.

As an instruction completes each stage of the instruction pipeline, an event signal is generated that is received by the thresholder that corresponds to the table entry of the instruction. The thresholder determines whether the instruction has completed execution of a particular stage of the instruction pipeline within the specified amount of time.

The thresholder may determine the appropriate interval by setting a timer or a set of timers equal to the value of a threshold register when the value or values of the threshold register or registers are first loaded into the thresholder. The timer for a particular stage can be canceled when the signal is received that specifies that the execution of the stage has been completed. If the timer expires and the appropriate stage has not yet completed its execution, a signal 662 may be generated that indicates that the stage of the instruction pipeline required more time than expected.

Alternatively, the thresholder may determine the appropriate interval by loading the values of the threshold registers into a countdown register. When a signal is received that specifies that the execution of a stage has been completed, the thresholder determines whether the appropriate countdown register is non-zero. If the value in the countdown register is zero, then a signal 662 may be generated that indicates that the stage of the instruction pipeline required more time than expected.

The use of countdown registers within thresholder 618 may also provide additional functionality. If the passage of a single selected instruction through the instruction pipeline is being observed, then threshold registers 654 may be initialized to zero. Input signal 619 then initializes the countdown timers in thresholder 618 to zero. When signal 617 is received that indicates the completion of the next stage of the instruction pipeline, thresholder 618 will then invariably generate signal 662. In this case, thresholder 618 provides a mechanism for alternatively monitoring the execution of individual stages of an instruction pipeline without regard to temporal intervals between the completion of the stages.

One or more PMCs are used to count occurrences of monitored events as controlled by fields in one or more MMCRs. Field 674 is used to generate control signal 661 so that PMC1 664 accepts threshold events, such as threshold signal 661, from the thresholders. Control signal 661 steers a threshold event in multiplexor 660 as controlled by field 674 in the MMCR. Threshold events may be added to the original value 665 of PMC1 664 by adder 663 and then stored back in PMC1 664. An adder is used to increment PMC1 as the architecture of the performance monitor may be generalized to count many different types of events. Alternatively, threshold event signals, such as signal 662, may be used to control an incrementer that counts the threshold events.

FIG. 6B depicts threshold registers as physical extensions of the instruction completion table. Alternatively, the threshold registers may be physically separate from the completion table yet may still be indexed by the event tag, allocation tag, and completion tag. FIG. 6B also depicts a thresholder associated with the table entries. Alternatively, threshold values may be written directly into the thresholders. For example, the load/store unit of the instruction may load the appropriate values directly into the thresholders.

In a manner similar to PMC1, field 676 is used to generate control signal 681 so that PMC2 684 accepts other threshold events, such as signal 682. Control signal 681 steers a threshold event in multiplexor 680 as controlled by field 676 in the MMCR. Threshold events may be added to the original value 685 of PMC2 684 by adder 683 and then stored back in PMC2 684.

Figure 7:
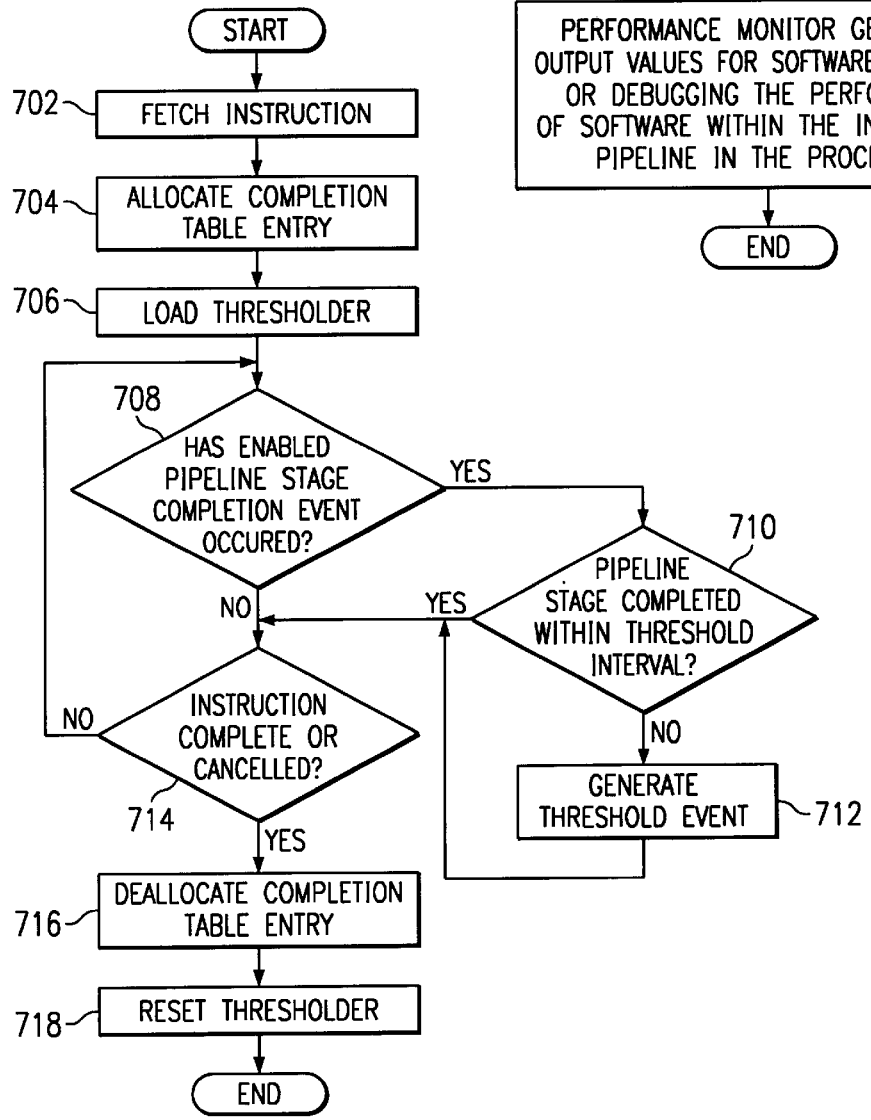
FIG. 7 is a flowchart depicting a process for monitoring the progress of an instruction through stages of an instruction pipeline.

With reference now to FIG. 7, a flowchart depicts a process for monitoring the progress of an instruction through stages of an instruction pipeline. FIG. 7 depicts only some of the actions that occur during the processing of an instruction, i.e. only some of the actions concerning the thresholder are depicted. The process begins by fetching an instruction (step 702).

After an entry in the completion table is allocated for the fetched instruction (step 704), the thresholder associated with the completion table entry is loaded with the pipeline stage threshold values from the threshold registers (step 706).

While the particular instruction is being executed, a determination is made as to whether an enabled event has occurred, which in this case is the completion of a stage in the instruction pipeline (step 708). If so, then a determination is made as to whether the stage of the instruction pipeline completed within its temporal interval or time period, i.e. whether it exceeded the threshold value (step 710). If so, then the instruction processing continues. If not, then an event is generated that allows the performance monitor to detect that the threshold value was exceeded (step 712), and the instruction processing continues.

As noted previously, if the threshold value is set to zero, then the occurrence of an event signaling the completion of an instruction pipeline stage causes the thresholder to generate an event signaling that a threshold interval has been exceeded. In this case, the performance monitor may interpret the threshold event as a completion event for an instruction pipeline stage.

If an enabled event has not occurred, then a determination is made as to whether an instruction has completed execution or has been canceled (step 714). If not, then the process loops back to continue monitoring the progression of an instruction through the instruction pipeline. If the instruction has completed or is canceled, then the instruction's entry in the completion table is deallocated (step 716). The process completes by resetting the instruction's associated thresholder(step 718).

Figure 8:
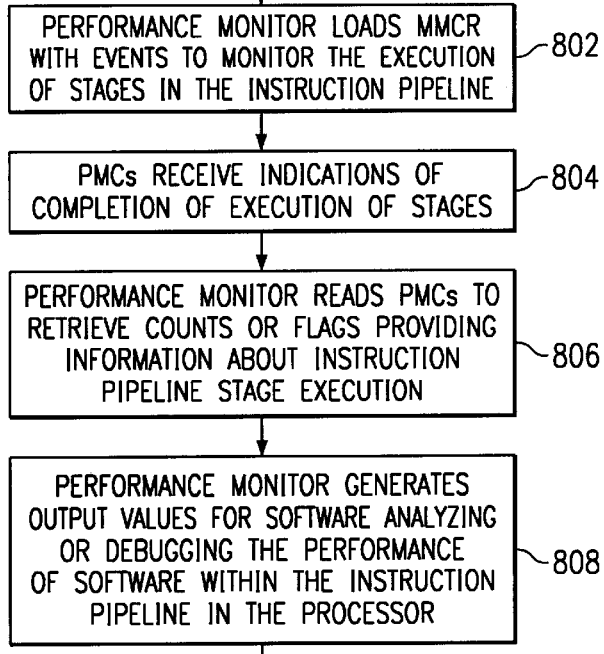
FIG. 8 is a flowchart depicting a process for using a performance monitor of an out-of-order processor to obtain information about the actions of the stages in an instruction pipeline.

With reference now to FIG. 8, a flowchart depicts a process for using a performance monitor of an out-of-order processor to obtain information about the actions of the stages in an instruction pipeline. As noted above, special registers within a performance monitor are accessible to software, such as a software package analyzing the performance of the hardware within the processor.

The process begins when the performance monitor loads the fields of the MMCR with the appropriate values that allow the monitoring of the execution of the stages of the instruction pipeline (step 802). The PMCs then receive indications of the completion of execution of stages in the instruction pipeline (step 804). The architecture of the performance monitor allows its counters and registers to be configured to monitor a variety of events and combinations of events. The performance monitor may-be configured to count multiple occurrences of events, or the progress of an individual instruction may be tracked by receiving a single event at different PMCs that indicate the completion of a stage in the instruction pipeline for a single tagged instruction. Alternatively, the PMCs may count threshold events that indicate that a stage of the instruction pipeline exceeded its threshold interval.

The performance monitor reads the PMCs to retrieve counts or flags that provide information about the execution of stages in the instruction pipeline (step 806), and an output value is generated for the software that is analyzing or debugging the performance of the instruction pipeline (step 808).

The advantages provided by the present invention are apparent in light of the detailed description of the invention provided above. Under certain circumstances, it is possible for the performance of the processor to be severely degraded by the slow execution of a single instruction. If one instruction executes more slowly than expected, then each time the instruction executes, it may cause a bottleneck for the entire instruction pipeline. The entire performance of the processor may be severely degraded because an instruction pipeline requires a smooth flow of instructions to reduce the average time required to execute a set of instructions.

If the instruction requires more time within only a particular stage of execution, then the instruction may create a bottleneck only at one particular stage of the instruction pipeline. The present invention allows the detection of unexpected results during instruction execution at individual stages of the instruction pipeline.

A more likely scenario is that particular instructions require more time to execute than expected only when certain other factors are present that contribute to the bottleneck. For example, a particular type of instruction may require more time to execute within the decoding stage of the instruction pipeline only when another type of instruction is within a sequencing stage of the instruction pipeline. Since instructions may be processed out-of-order, it may be difficult to analyze the order in which the instructions appear within the instruction pipeline. By being able to monitor the execution of an instruction within individual stages of the instruction pipeline, the entire instruction pipeline may be monitored to determine other factors affecting the performance of the instruction pipeline.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring the execution of an instruction within a pipelined processor, wherein the pipelined processor comprises a plurality of instruction pipeline units and a performance monitor, the method comprising:

specifying an event to be monitored by the performance monitor, wherein the specified event is completion of processing of an instruction by an instruction pipeline unit in an amount of time that exceeds a specified threshold value;

fetching an instruction; and monitoring for the specified event during the execution of the fetched instruction by the pipelined processor.

2. The method of claim 1 further comprising:

counting occurrences of the specified event.

3. The method of claim 1 further comprising:

specifying a plurality of events to be monitored by the performance monitor, wherein the specified events are completion of processing of an instruction by each instruction pipeline unit in an amount of time that exceeds a threshold value, wherein the instruction has an associated threshold value for each instruction pipeline unit.

4. The method of claim 1 further comprising:

specifying an event to be monitored by the performance monitor, wherein the specified event is completion of processing of a tagged instruction by an instruction pipeline unit in an amount of time that exceeds a specified threshold value;

tagging a fetched instruction; and monitoring for the specified event during the execution of the tagged instruction by the pipelined processor.

5. The method of claim 4 wherein a plurality of tagged instructions may be monitored simultaneously by the performance monitor.

6. The method of claim 4 further comprising:

selecting an instruction to be tagged based upon one or more characteristics of the instruction selected from the group of: an instruction address for the instruction; an instruction type of the instruction; and a category of the instruction type of the instruction.

7. The method of claim 4 further comprising:

receiving a first stage-completion signal in response to a first instruction pipeline unit completing its processing of the instruction and a second stage-completion signal in response to a second instruction pipeline unit completing its processing of the instruction;

determining whether a temporal interval between the receipt of the first stage-completion signal and the receipt of the second stage-completion signal is less than a temporal threshold value; and generating a threshold event as the specified event if the temporal interval exceeds the temporal threshold value.

8. A data processing system comprising a pipelined processor, wherein the pipelined processor comprises a plurality of instruction pipeline units and a performance monitor, the data processing system further comprising:

specifying means for specifying an event to be monitored by the performance monitor, wherein the specified event is completion of processing of an instruction by an instruction pipeline unit in an amount of time that exceeds a specified threshold value;

fetching means for fetching an instruction; and monitoring means for monitoring for the specified event during the execution of the fetched instruction by the pipelined processor.

9. The data processing system of claim 8 further comprising:

counting means for counting occurrences of the specified event.

10. The data processing system of claim 8 further comprising:

specifying means for specifying a plurality of events to be monitored by the performance monitor, wherein the specified events are completion of processing of an instruction by each instruction pipeline unit in an amount of time that exceeds a threshold value, wherein the instruction has an associated threshold value for each instruction pipeline unit.

11. The data processing system of claim 8 further comprising:

specifying means for specifying an event to be monitored by the performance monitor, wherein the specified event is completion of processing of a tagged instruction by an instruction pipeline unit in an amount of time that exceeds a specified threshold value;

tagging means for tagging a fetched instruction; and monitoring means for monitoring for the specified event during the execution of the tagged instruction by the pipelined processor.

12. The data processing system of claim 11 wherein a plurality of tagged instructions may be monitored simultaneously by the performance monitor.

13. The data processing system of claim 11 further comprising:

selecting means for selecting an instruction to be tagged based upon one or more characteristics of the instruction selected from the group of: an instruction address for the instruction; an instruction type of the instruction; and a category of the instruction type of the instruction.

14. The data processing system of claim 11 further comprising:

receiving means for receiving a first stage-completion signal in response to a first instruction pipeline unit completing its processing of the instruction and a second stage-completion signal in response to a second instruction pipeline unit completing its processing of the instruction;

determining means for determining whether a temporal interval between the receipt of the first stage-completion signal and the receipt of the second stage-completion signal is less than a temporal threshold value; and generating means for generating a threshold event as the specified event if the temporal interval exceeds the temporal threshold value.

15. A computer program product on a computer-readable medium for use in a data processing system comprising a pipelined processor, wherein the pipelined processor comprises a plurality of instruction pipeline units and a performance monitor, the computer program product further comprising:

first instructions for specifying an event to be monitored by the performance monitor, wherein the specified event is completion of processing of a fetched instruction by an instruction pipeline unit in an amount of time that exceeds a specified threshold value; and monitoring means for monitoring for the specified event during the execution of the fetched instruction by the pipelined processor.

16. The computer program product of claim 15 further comprising:

instructions for counting occurrences of the specified event.

17. The computer program product of claim 15 further comprising:

instructions for specifying a plurality of events to be monitored by the performance monitor, wherein the specified events are completion of processing of the fetched instruction by each instruction pipeline unit in an amount of time that exceeds a threshold value, wherein the fetched instruction has an associated threshold value for each instruction pipeline unit.

18. The computer program product of claim 15 further comprising:

instructions for specifying an event to be monitored by the performance monitor, wherein the specified event is completion of processing of a tagged instruction by an instruction pipeline unit in an amount of time that exceeds a specified threshold value;

instructions for tagging the fetched instruction; and monitoring means for monitoring for the specified event during the execution of the tagged instruction by the pipelined processor.

19. The computer program product of claim 18 further comprising:

instructions for receiving a first stage-completion signal in response to a first instruction pipeline unit completing its processing of the fetched instruction and a second stage-completion signal in response to a second instruction pipeline unit completing its processing of the fetched instruction;

instructions for determining whether a temporal interval between the receipt of the first stage-completion signal and the receipt of the second stage-completion signal is less than a temporal threshold value; and instructions for generating a threshold event as the specified event if the temporal interval exceeds the temporal threshold value.

20. A method of monitoring the execution of an instruction within a pipelined processor, wherein the pipelined processor comprises a plurality of instruction pipeline units, the method comprising:

fetching an instruction;

tagging the instruction;

receiving a first stage-completion signal in response to a first instruction pipeline unit completing its processing of the tagged instruction and a second stage-completion signal in response to a second instruction pipeline unit completing its processing of the tagged instruction;

determining whether a temporal interval between the receipt of the first stage-completion signal and the receipt of the second stage-completion signal is less than a temporal threshold value; and generating a threshold event if the temporal interval is not less than the temporal threshold value.

21. The method of claim 20 further comprising:

monitoring for a threshold event by a performance monitor in the pipelined processor during the execution of the tagged instruction.

22. The method of claim 21 wherein a plurality of tagged instructions may be monitored simultaneously by the performance monitor.

23. A data processing system comprising a pipelined processor, wherein the pipelined processor comprises a plurality of instruction pipeline units, the data processing system further comprising:

fetching means for fetching an instruction;

tagging means for tagging the instruction;

receiving means for receiving a first stage-completion signal in response to a first instruction pipeline unit completing its processing of the tagged instruction and a second stage-completion signal in response to a second instruction pipeline unit completing its processing of the tagged instruction;

determining means for determining whether a temporal interval between the receipt of the first stage-completion signal and the receipt of the second stage-completion signal is less than a temporal threshold value; and generating means for generating a threshold event if the temporal interval is not less than the temporal threshold value.

24. The data processing system of claim 23 further comprising:

monitoring means for monitoring for a threshold event by a performance monitor in the pipelined processor during the execution of the tagged instruction.

25. The data processing system of claim 24 wherein a plurality of tagged instructions may be monitored simultaneously by the performance monitor.

26. A method of monitoring the execution of an instruction within a pipelined processor, wherein the pipelined processor comprises a plurality of instruction pipeline units, the method comprising:

fetching an instruction;

receiving a first stage-completion signal in response to a first instruction pipeline unit completing its processing of the instruction and a second stage-completion signal in response to a second instruction pipeline unit completing its processing of the instruction;

determining whether a temporal interval between the receipt of the first stage-completion signal and the receipt of the second stage-completion signal is less than a temporal threshold value; and generating a threshold event if the temporal interval is not less than the temporal threshold value.

27. A data processing system comprising a pipelined processor, wherein the pipelined processor comprises a plurality of instruction pipeline units, the data processing system further comprising:

fetching means for fetching an instruction;

receiving means for receiving a first stage-completion signal in response to a first instruction pipeline unit completing its processing of the instruction and a second stage-completion signal in response to a second instruction pipeline unit completing its processing of the instruction;

determining means for determining whether a temporal interval between the receipt of the first stage-completion signal and the-receipt of the second stage-completion signal is less than a temporal threshold value; and generating means for generating a threshold event if the temporal interval is not less than the temporal threshold value.

28. A computer program product on a computer-readable medium for use in a data processing system comprising a pipelined processor, wherein the pipelined processor comprises a plurality of instruction pipeline units, the computer program product further comprising:

first instructions for receiving a first stage-completion signal in response to a first instruction pipeline unit completing its processing of a fetched instruction and a second stage-completion signal in response to a second instruction pipeline unit completing its processing of the fetched instruction;

second instructions for determining whether a temporal interval between the receipt of the first stage-completion signal and the receipt of the second stage-completion signal is less than a temporal threshold value; and third instructions for generating a threshold event if the temporal interval is not less than the temporal threshold value.

29. A computer program product on a computer-readable medium for use in a data processing system comprising a pipelined processor, wherein the pipelined processor comprises a plurality of instruction pipeline units, the computer program product further comprising:

first instructions for tagging a fetched instruction;

second instructions for receiving a first stage-completion signal in response to a first instruction pipeline unit completing its processing of the tagged instruction and a second stage-completion signal in response to a second instruction pipeline unit completing its processing of the tagged instruction;

third instructions for determining whether a temporal interval between the receipt of the first stage-completion signal and the receipt of the second stage-completion signal is less than a temporal threshold value; and fourth instructions for generating a threshold event if the temporal interval is not less than the temporal threshold value.

* * * * *